Oct. 2, 1945.  E. O. MEHLINE ET AL  2,385,828
FOOD PROCESSING MECHANISM
Filed Sept. 8, 1941  8 Sheets—Sheet 6
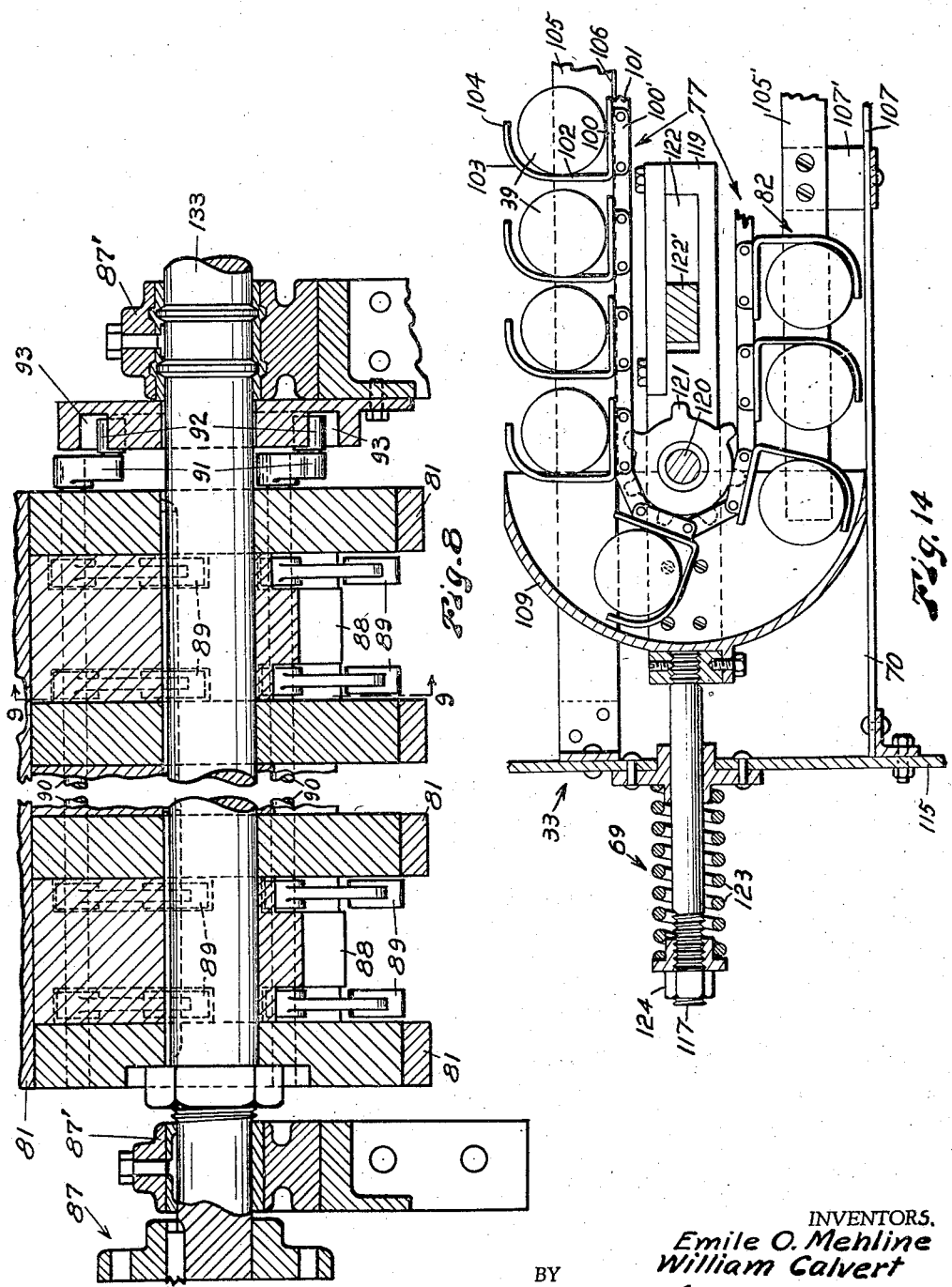
INVENTORS.
Emile O. Mehline
William Calvert
BY
ATTORNEY

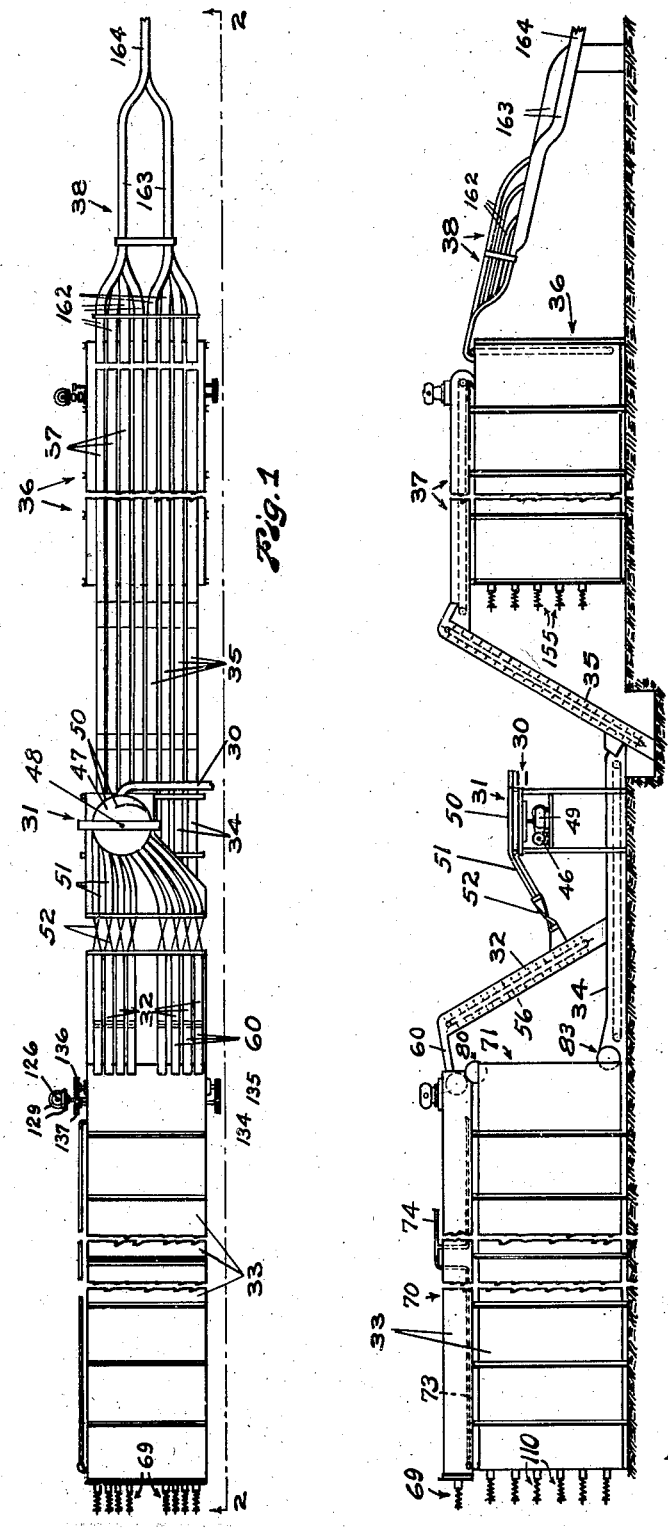

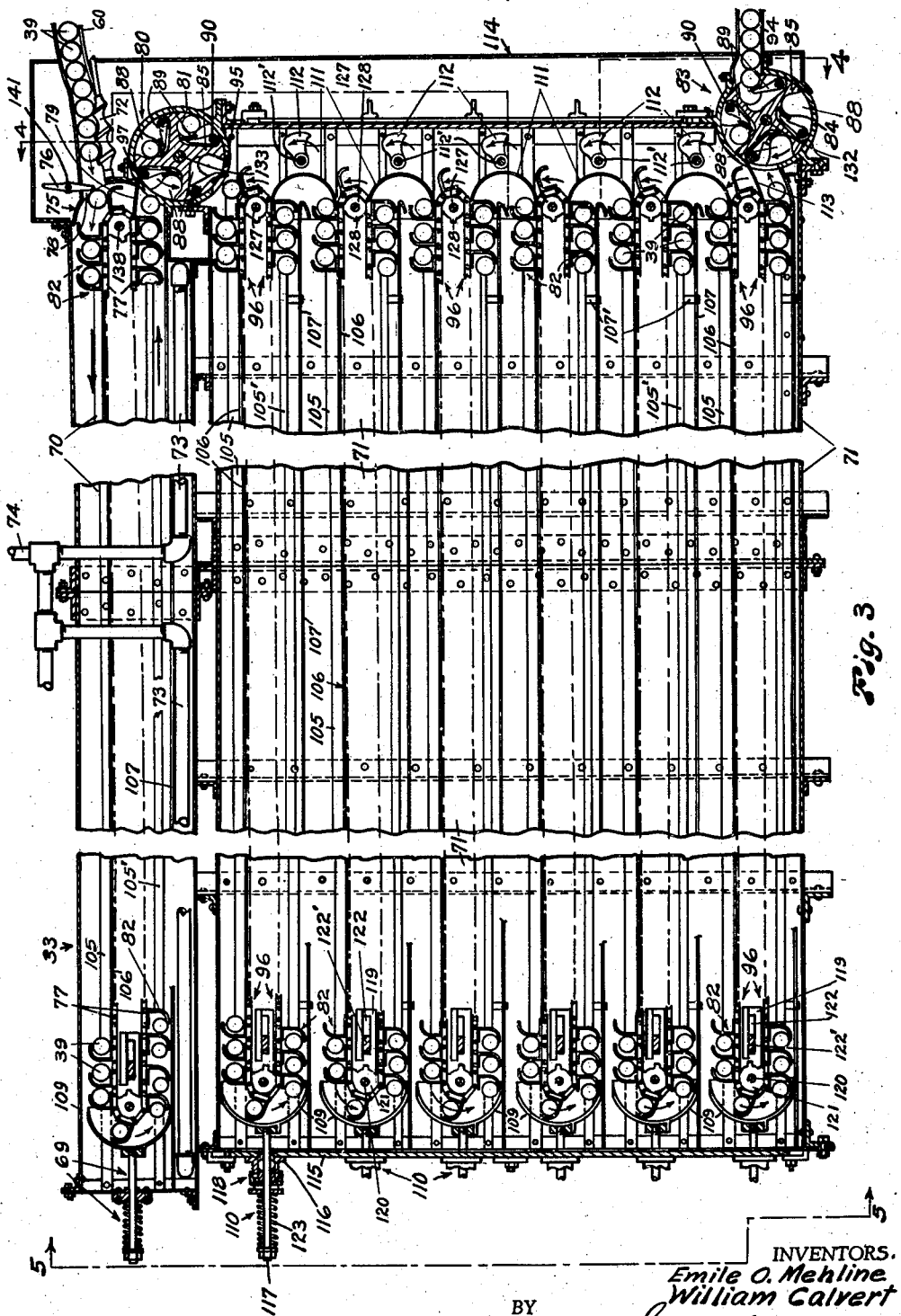

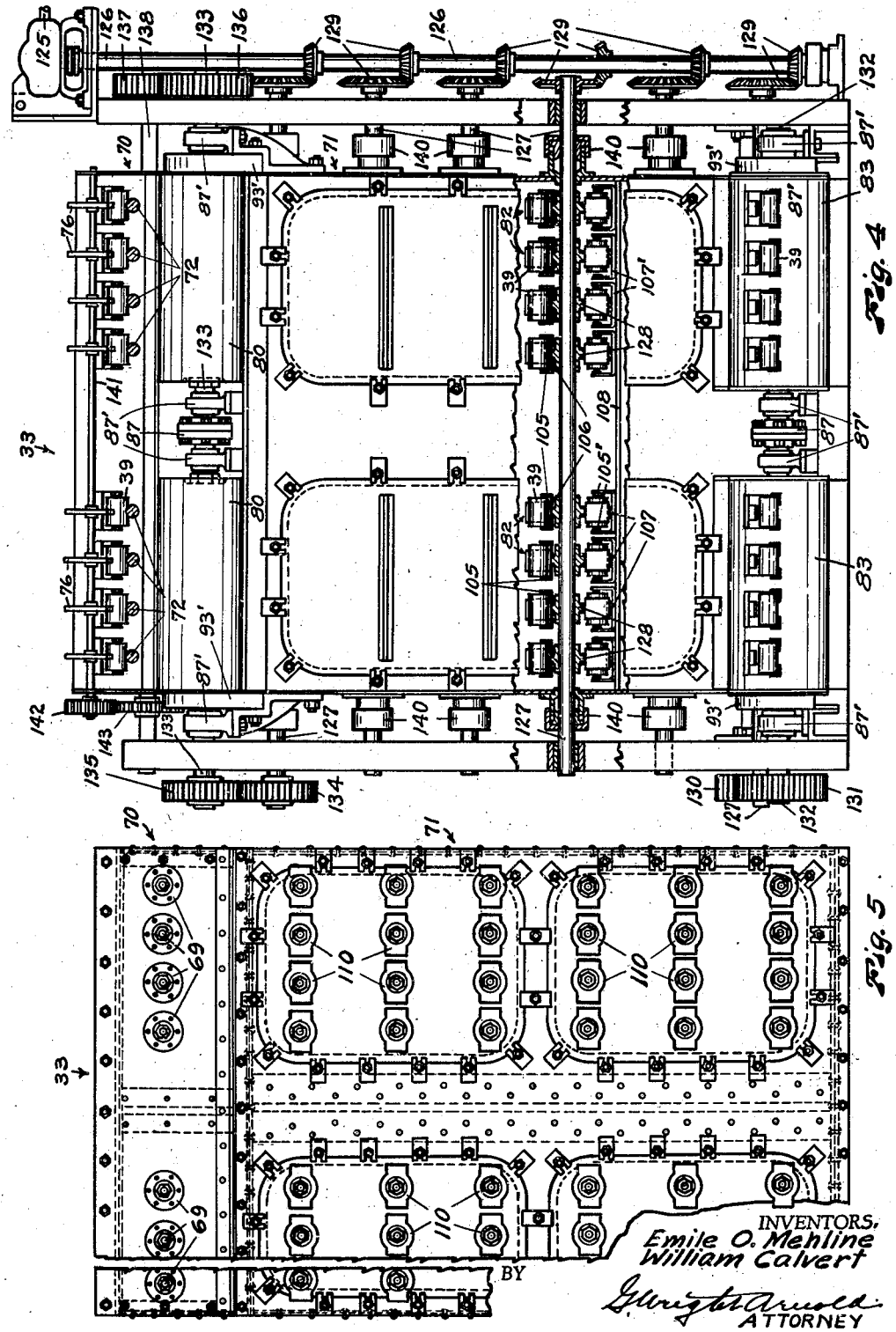

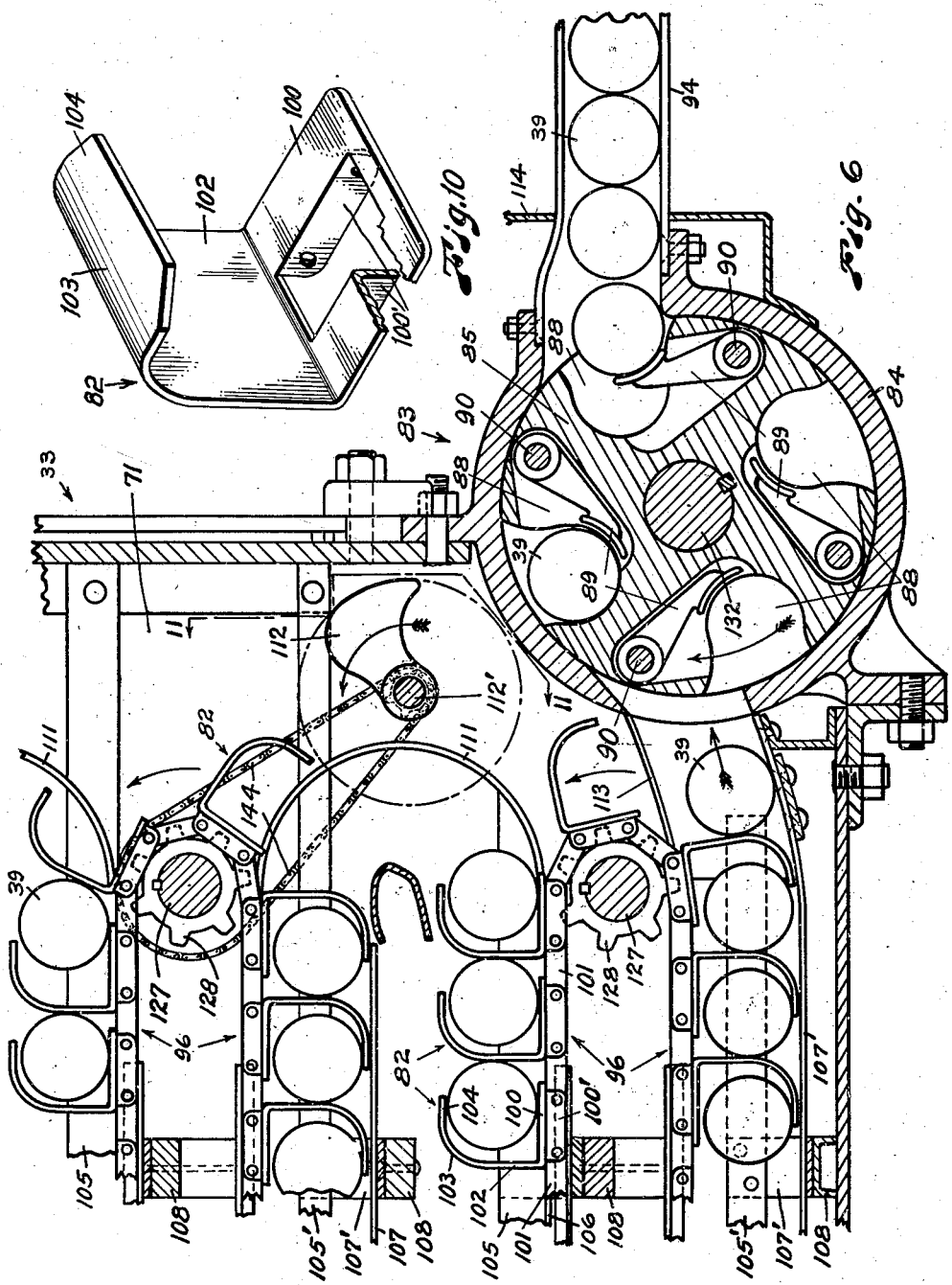

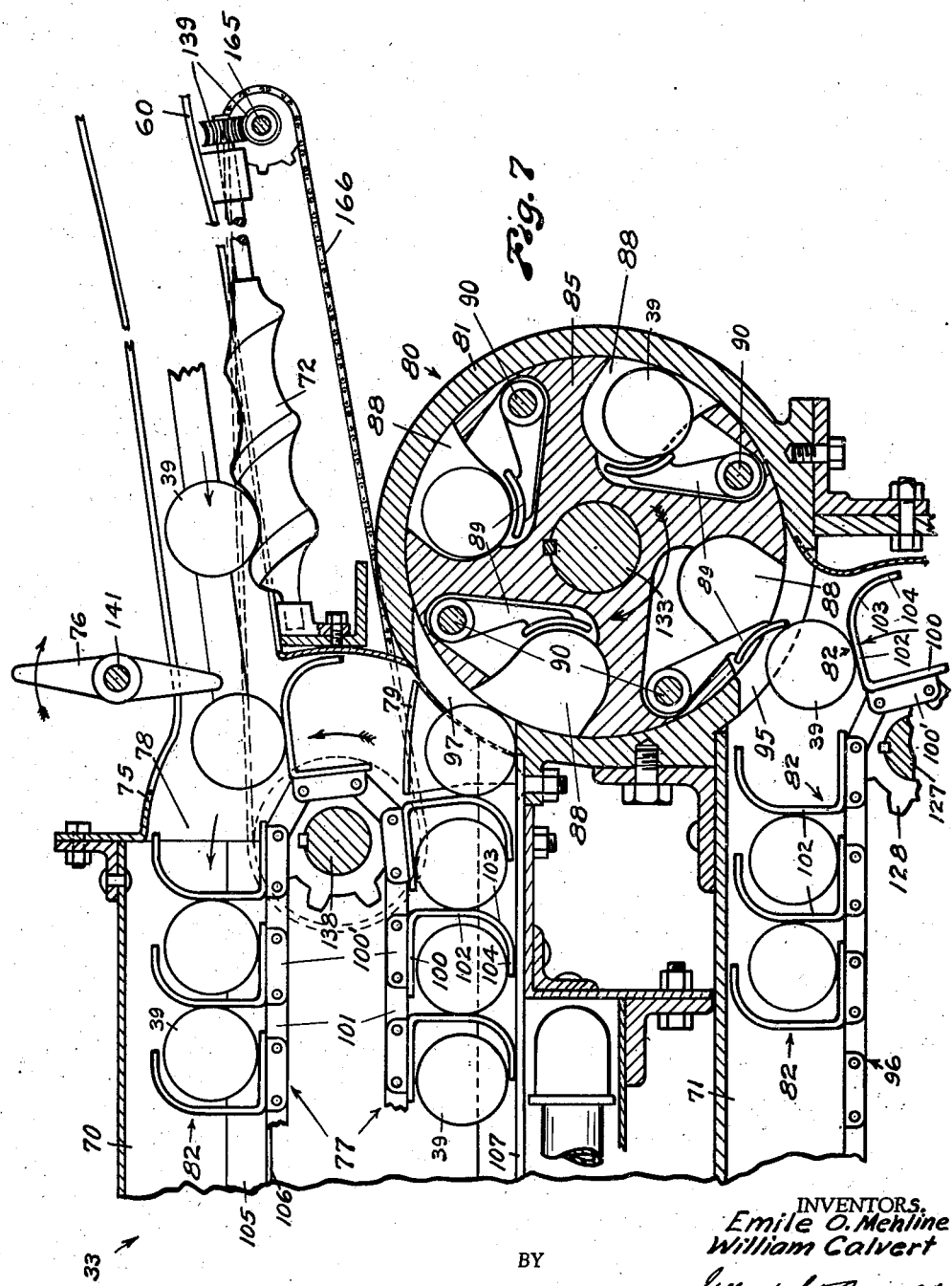

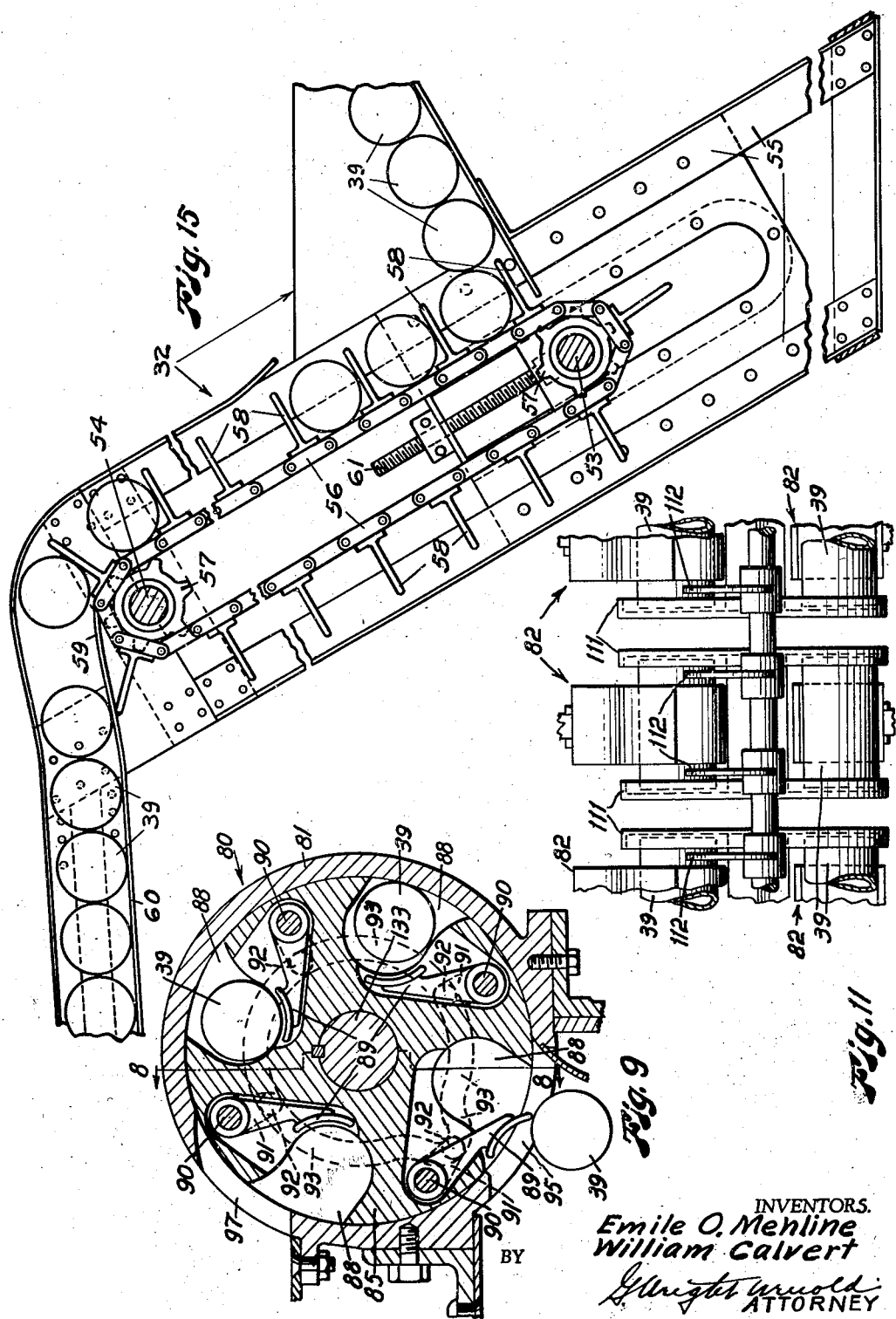

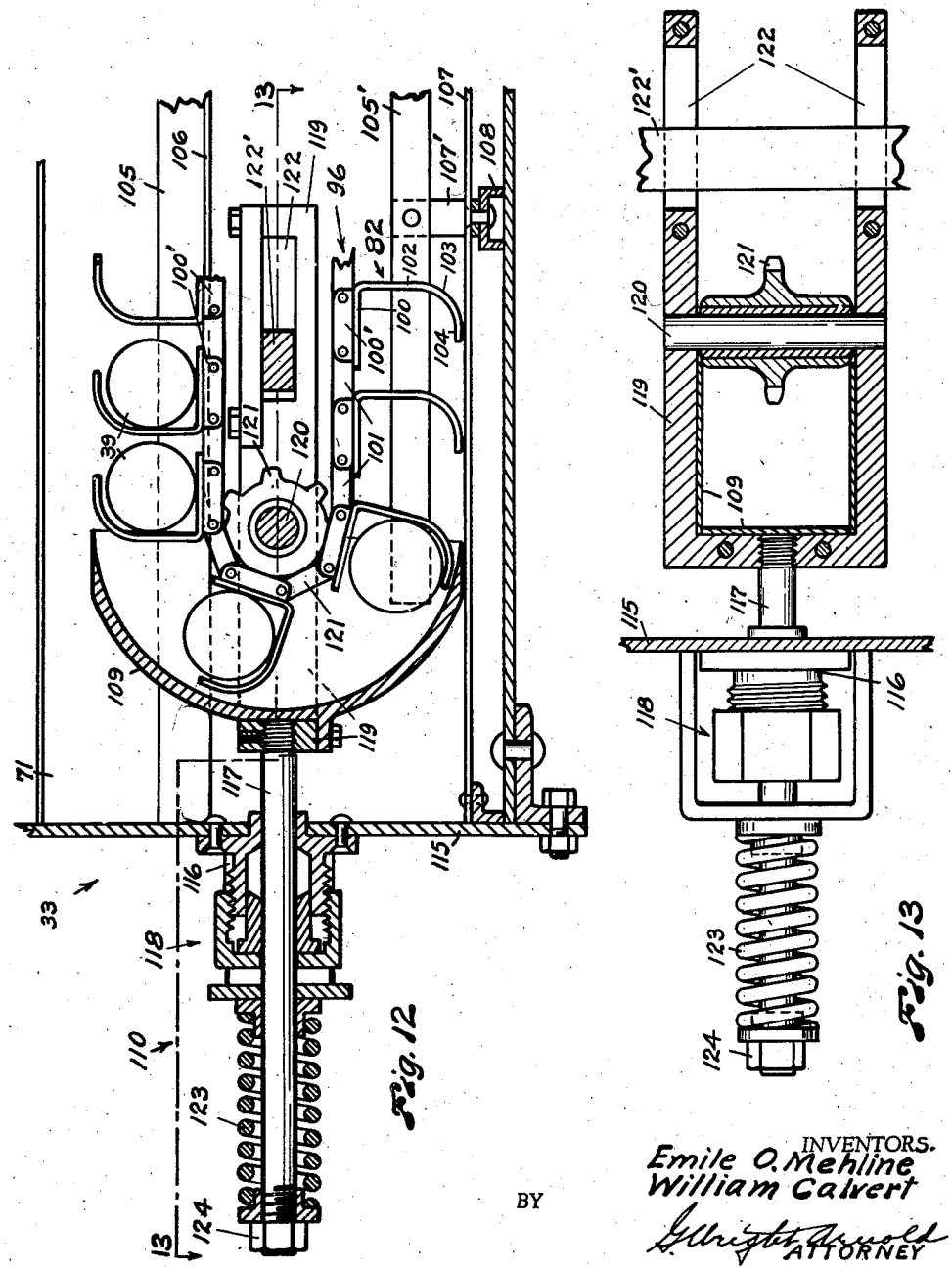

Patented Oct. 2, 1945

2,385,828

UNITED STATES PATENT OFFICE 2,385,828

FOOD-PROCESSING MECHANISM

Emile O. Mehline and William Calvert,
Seattle, Wash.

Application September 8, 1941, Serial No. 410,090

1 Claim. (Cl. 99—361)

This invention relates to a canning mechanism for food products providing for a continuous in-line production.

While standards have been adopted by the Food and Drug Administration setting forth temperatures and periods of exposure to be employed in the canning of various food products generally foods may be classified as those which may be cooked at or below the boiling point in existing atmospheric pressure, as for example fruits, and those which must be cooked at elevated temperatures and hence pressures above atmospheric pressure, as for example fish products. Devices embodying the present invention are particularly useful in the canning of products requiring elevated temperatures and pressures, and for purposes of description and illustration but without limitation as to the scope of the invention or of the uses to which devices embodying the invention may be put, the invention will be more particularly described in connection with the canning of salmon.

At the present time in the commercial canning of salmon, cans are filled with washed and cleaned salmon meat and to a location below the top of the can. The space left at the top of the can above the salmon meat is generally referred to as "head space." The head space left in the top of a one-pound tall standard can is eleven thirty-seconds (11/32) of an inch. Thereafter the cans are partly sealed, leaving an opening to permit the drawing of a vacuum within the can. Then a vacuum is drawn in the cans and the cans are sealed. The extent of the vacuum drawn is such that a vacuum pressure of approximately fifteen inches will be present after the cans of salmon have been cooked and cooled. Generally ς ηaking the vacuumizing machine will show approximately twenty-one inches of vacuum when the cans are sealed. Such cans if opened before cooking will show a vacuum of approximately nine to twelve inches, and after cooking and cooling the cans will show a vacuum of approximately fifteen inches. After vacuumizing and sealing, the cans of salmon are placed on trays, which are termed in the art "coolers." Generally each cooler accommodates one hundred and forty-four No. 1 tall standards cans and has a surface area approximately thirty-eight square inches. The loaded trays or coolers are placed on cars and moved into cookers, which are generally horizontal tubular retorts.

It is known that the food product within the cans will spoil unless the cooking process is started in rather short time periods (often thirty minutes or less) after the cans have been filled, vacuumized and sealed. For example, in a paper read at the 8th annual canned salmon cutting demonstration at Seattle, Washington, on March 15, 1940, Mr. D. F. Sampson, who is the district manager of research of the American Can Company, in part stated:

"It is not unusual for closed cans of salmon to stand for some time before the process is started. Accumulation of cans between the closing machines and retorts is an indication of insufficient retort or steam capacity. Ideally, every truckload of salmon should move directly from the closing machine into a retort. Some time may be required to fill the retort, but there should be no excessive delay before the closed cans are processed. If the closed cans stand too long spoilage may result. Canners of meats and poultry have learned that if cans stand much over half an hour spoilage may result. In some instances these products are contaminated with bacteria of the type of Bacillus welchii. These bacteria grow very rapidly and produce large volumes of gas, mostly hydrogen, but do not produce typical odors of decomposition. In one instance, sufficient gas was produced to swell cans in one hour. We might add that these bacteria are not heat resistant and are readily destroyed during the process."

Mr. Sampson thus indicated that the ideal situation was one where the filled, vacuumized and sealed cans should go directly to the cooking retort. Mr. Sampson thus merely reiterated the knowledge of those skilled in the art that long standing problems existed to positively eliminate any delay between the filling, vacuumizing and sealing of the cans and the cooking step. However, Mr. Sampson provided no answer to the problem he stated except indicating the necessity for more perfect coordination between the operation of the cooking retort and the filling, vacuumizing and sealing steps. However, the time necessary to accumulate sufficient number of filled cans to fill a retort, the inherent lack of perfect coordination between an in-line production system for providing filled cans and a batch system of cooking, and the human element of error is such that in commercial production a very substantial number of cans filled with food products are annually spoiled because of the time delays resulting from a batch system of cooking.

In the handling of the cans in loading and unloading the coolers or trays and the moving of the cars having thereon a number of loaded trays or coolers in superposed relation, it is common for cans to be damaged and generally two to six cans of each loaded tray or cooler are damaged, either in the loading or unloading of the cooler or movement of the loaded cars into or out of the cooking retort. The dropped and damaged cans dent, thus reducing the head space and vacuum allowance within the can and resulting, where the reduction is substantial, in spoilage of the contents of the cans.

The retorts heretofore commonly used are steam heated to provide for the desired speed of heating. When steam is first permitted to pass into such retorts, the retorts are open to the atmosphere to provide a desired temperature at atmospheric pressure until sufficient of the liquids within the can vaporize to provide a desired steam pressure therein. During this operation substantial quantities of steam are used with resultant great heat losses, as the steam is permitted to pass out of the retort and into the atmosphere.

After sufficient pressure is developed within the cans, the retorts are closed from the atmosphere, permitting the building up of pressures within the retort, (which usually takes twelve to fifteen minutes), and the attaining of elevated temperatures. The steam developed within the can during the preheating step is necessary to prevent collapse of the cans by the pressures obtaining during the cooking stage when the retort is sealed from the atmosphere and elevated pressures obtain. After the cans of salmon have been processed at the desired temperature and for the desired period of time, (at 242° F. temperature for a period of one and one-half hours), the pressure in the retort is gradually lowered (termed in the art "blowing down") and which takes 12 to 15 minutes and then the retort is opened and the cars, loaded with trays of cans, are removed from the retort. All the live steam which is used in providing the desired temperature and pressure in the retort obviously escapes, thus a further loss of steam occurs.

In connection with the loss of steam from the prior art retorts, the size and character of the retorts indicate generally the tremendous character of the loss. Retorts are generally horizontal tubular members with doors at each end, having a diameter of approximately six feet and being as long as 32 feet. Canneries commonly use three to ten car retorts which will be respectively approximately six to thirty-six feet long.

After the cars loaded with trays of salmon are removed from the retort, they must be cooled to stop further cooking of the salmon.

During the past years many developments have been made in the machinery handling the cans in the steps or processes ahead of the retort. Generally speaking, the can handling machines employed in the various processes ahead of the retort have increased to handle approximately two hundred and fifty cans a minute as distinguished from approximately seventy cans a minute which was common prior to the said improvements. Also the can handling machines operating in the line of production after the cans have been cooled, have been increased to provide a capacity even greater than the capacity of the can handling devices ahead of the retorts.

All the various improvements have worked toward a conveyor in-line production to provide a continuous stream of processed cans of salmon. However, not to our knowledge has a commercially successful continuous process heating and cooking retort been heretofore devised, so that heretofore in the commercial canning of salmon, the batch system of preheating the cans and cooking the cans has been employed.

In view of the batch system employed in the retort, a batch system has been heretofore used in the cooling of the cans, so that there has not been a cooling of each individual can at a predetermined time period after its cooking, thus resulting in continued cooking within the individual cans for different periods of time after the intended cooking period and prior to completion of the cooling. Furthermore the batch system of cooling has resulted in batches of cans being delivered to the casing or packing machines following the cooling operation, and as a result it is common practice in Alaska canneries to pile cans until the canning season is over and then to proceed with the casing and shipment of substantially the entire canned salmon pack. In other words, the batch system of cooking has brought about a batch system of cooling and in turn a batch system of casing. A great disadvantage results from the batch casing of canned salmon in that the cannery is not in a position to ship its canned salmon until after the canning season is over. This requires considerable warehouse space which is at a premium in Alaska canneries, as most canneries are built over the water on piling so that warehouses are expensive to build. Next the ships which continually bring supplies to the canneries during the canning season travel south with empty cargo space, rather than carrying the salmon canned to date. The salmon canned to date cannot be shipped as it is not continuously packed and cased after canning and cooling, but is more often stacked in piles around the canneries. The commercial system heretofore used not only loses the cargo space available on ships during the canning season, but taxes to a limit the cargo space available after the canning season is over, and many boats are required to travel relatively empty to Alaska to pick up the cased canned salmon after the canning season is over. The market price for canned salmon early in the canning season is generally higher than the price prevailing after the canning season has ended, and a price disadvantage results from the packing and casing of salmon after the canning season is over rather than as a part of a continuous in-line production.

With the salmon pack arriving at ports, as Seattle, substantially at one time, rather than continuously through the canning season, the inspection facilities of the Food and Drug Department are taxed to the limit. In many seasons approximately five months elapse before all of a season's pack is inspected and released by the Food and Drug Department. This delay of course provides a serious financial disadvantage to the salmon packers.

The prior art commercial canning of food products has thus been characterized by continuous processing up to the stage of cooking and then a batch treatment. This batch cooking step has heretofore proved to be the "bottle neck" of the commercial canning processes and has resulted in inefficient utilization of both material and labor.

It is an object of the present invention to provide a combination preheater and cooking device where the filled, vacuumized and sealed cans may be delivered in a continuous stream to the preheater and cooking device and discharged therefrom in a similar stream.

It is a further object of this invention to provide a preheating chamber disposed above and in superposed relation to the cooking chamber and so connected therewith that any heat rising or escaping from the cooking chamber will be utilized in the preheating chamber.

It is a further object of the invention to provide a cooking chamber wherein most complete utilization of the space therein is attained.

It is a further object of this invention to provide conveyor means moving the filled cans through the cooking chamber with a minimum of agitation to the canned products to eliminate any possibility of mincing or breaking up of the texture of the products in the can. While the canned products are moved through the cooking retort, they obviously attain a very high temperature and at such period of time agitation of the cans will tend to cause the products to lose their form. While this is true in the case of most products, it is particularly true in the case of products, as salmon. The above mentioned agitation is of course to be distinguished from periodic gentle turning movements which cause the liquids to pass through the pieces of salmon and beneficially reduce the necessary cooking period. It has been found that a plurality of periodic turnings or partial rotary movements of the filled cans not only reduces the cooking period but eliminates uneven cooking, dry cooking and sticking of the salmon skin to the can. In other words, the devices of this invention provide for more rapid and uniform cooking and at the same time a product with a better texture.

It is a further object of the invention to provide a cooking chamber in which is disposed a plurality of superposed conveyors where the filled, vacuumized and sealed cans travel in one direction on the upper lap of a conveyor, thence around to the lower lap of the conveyor, across the conveyor on the lower lap to the first mentioned end, and are then discharged to and received by the next lower conveyor means and are thereafter, in the number of conveyors present, subjected to the same treatment.

It is a further object of the invention to provide a cooking chamber wherein horizontal conveyor chains are provided which are loaded and discharged at the same end of the conveyors.

It is a further object of the invention to provide a plurality of carrier devices or buckets mounted on conveyor means, each of which buckets is characterized by having a portion extending in the plane of the conveyor, then a portion extending at right angles to the conveyor, then a curved portion, and then a straight portion, —said last two portions extending in a direction counter to the direction of the travel of the conveyor, whereby a can may be conveyed by one bucket member and the portion of the next succeeding bucket member positioned at right angles to the conveyor.

It is a further object of the invention to provide inlet valve means and outlet valve means disposed respectively in an upper and in a lower portion of a cooking chamber to deliver uncooked canned products into and cooked canned products out from the cooking chamber and at the same time maintain a cooking chamber sealed from atmospheric temperatures and pressures.

It is a further object of the invention to provide a cylindrical valve member provided with can carrying pocket members therein and positively driven discharge levers for ejecting cans from the pockets of the cylindrical valve member.

It is a further object of the invention to provide a device which is open to the atmosphere, having a plurality of can carrying conveyors therein, and connected with a liquid of a desired temperature whereby said device may be used as a cooler member (with the liquid at a desired temperature) in combination with a cooking retort or may be used as a low pressure cooking member and the liquid heated by water or steam to a desired temperature.

It is a further object of the invention to provide cooking devices wherein a plurality of conveyor means in side by side relation may be employed so that a plurality of streams of cans may be processed at one time.

It is a further object of the invention to provide a plurality of mechanisms so that sealed and vacuumized cans may be received as they are delivered from the usual can sealing devices, the filled cans cooked and then cooled, and then the cans delivered in a continuous stream to the packaging or casing devices.

It is a further object of the invention to provide a simple, efficient and economical preheater, cooking device, and cooler device which requires minimum space and provides for maximum production and the most efficient utilization of material and labor.

The above mentioned general objects of this invention, together with others inherent in the same, are attained by the mechanism illustrated in the following drawings, the same being preferred exemplary forms of embodiment of this invention, throughout which drawings like reference numerals indicate like parts:

Figure 1 is a fragmentary schematic plan view and on a somewhat reduced scale showing various apparatus employed in the present invention and particularly correlating an operative arrangement thereof;

Fig. 2 is a fragmentary schematic side elevation of the apparatus shown in Fig. 1 looking in the direction of broken line 2—2 of Fig. 1;

Fig. 3 is a view with parts in side elevation and parts in section and with parts broken away showing a preheating and cooking retort embodying the present invention—portions of the conveyors 77 and 96 and the pockets 82 being indicated schematically by dot and dash lines;

Fig. 4 is a view partly in end elevation and partly in section taken substantially on broken line 4—4 of Fig. 3, the hood 114 that is shown in Fig. 3 being omitted;

Fig. 5 is a view in end elevation, with parts being broken away taken substantially on 5—5 of Fig. 3;

Fig. 6 is an enlarged fragmentary view partly in section and partly in elevation of the mechanism shown in Fig. 3 and particularly showing the discharge portion of the cooking retort of Fig. 3;

Fig. 7 is a view similar to Fig. 6, except showing particularly the transfer mechanism between the preheating device and the intake portion of the said cooking retort;

Fig. 8 is a longitudinal sectional view, with parts broken away and with parts in elevation, of valve mechanism used in the intake valve member and which is substantially the same as that used in the discharge valve member and taken substantially on broken line 8—8 of Fig. 9;

Fig. 9 is a fragmentary sectional view taken substantially on broken line 9—9 of Fig. 8, showing particularly in dotted lines the cam arrangement for rejecting cans from the valve member;

Fig. 10 is a fragmentary perspective view of a bucket or can conveying member embodied in the present invention;

Fig. 11 is a fragmentary view taken substantially on broken line 11—11 of Fig. 6 showing the operative relation of the pockets or buckets, the rotating boosters, and the can guides;

Fig. 12 is a fragmentary view partly in section and partly in elevation showing particularly a chain take-up device used in the said cooking retort;

Fig. 13 is a plan view of the apparatus shown in Fig. 12 showing parts in section substantially on broken line 13—13 of Fig. 12;

Fig. 14 is a view similar to Fig. 12, except showing particularly a chain take-up device used in the preheater portion of the cooking retort;

Fig. 15 is a fragmentary view in elevation with parts shown in section of an elevator mechanism, 32 and 35 shown in Fig. 2.

Referring to Figs. 1 and 2 of the drawings, the parts which are shown in later drawings are here schematically illustrated for the purpose of enabling one to more completely visualize the complete structure. Comparing such Figs. 1 and 2 to later figures, inlet 30 represents an inlet where a continuous stream of filled, vacuumized and sealed cans are delivered. This stream, in commercial production, will come from the can sealing mechanism. The can sealing mechanism, which forms no part of the present invention, is not here illustrated or described.

The stream of cans from the inlet 30 passes through the divider mechanism 31. This divider mechanism functions to divide the one stream of cans from the inlet 30 into a plurality of streams of cans, as eight. The eight streams of cans which leave the divider mechanism 31 are delivered from the divider 31 via elevator mechanism 32 (shown in detail in Fig. 15) to the combination preheater and cooking retort 33. The combination preheater and cooking retort 33 is also shown in Figs. 3 to 14 of the drawings wherein the filled, vacuumized and sealed cans are subjected to the desired cooking treatment and then delivered to a conveyer mechanism 34 shown in Fig. 2. From the conveyer mechanism 34 the cans are delivered to an elevator 35, which may be similar to the elevator mechanism 32 (also shown in Fig. 15), thence to the conveyor mechanism 37 (which may be similar to the conveyer 34) and thence to the cooler 36.

After the cans have been properly cooled to retard all further cooking they are delivered out of the cooler 36 to converger 38. In the converger 38 the eight streams of cans are converged to form a single stream of cans and the single stream of cans delivered from the converger 38 will be delivered to the desired packaging and casing machines so that the then completely processed cans of food products may be cased as a continuous step in the process.

Referring to the divider 31 a rotating driven disk 47 is mounted on a shaft 48 which is connected to electric motor 46 through reduction unit 49. A fixed guide 50 is provided so that cans which are urged upon the rotating disk or turn table 47 will not interfere with the delivery of cans onto the rotating disk 47. By centrifugal force cans 39 on the rotating disk 47 are moved in a radial direction and enter one of the various troughs or chutes 51. The number of troughs or chutes 51 to be used will depend upon the number of streams of cans desired, which in the present illustration is eight. The cans in each trough or chute 51 enter a can twister 52. The can twister 52 may be of usual construction and serves to turn the cans from an upright position where they rest on one end through an angle of 90° so that the cans rest on their sides. Thus eight streams are provided with the various cans resting on their sides.

In Figs. 1, 2, and 15 we show elevator means generally illustrated by 32 for delivering the streams of cans provided by the divider numbered 31 in Figs. 1 and 2 to the combination preheater and retort numbered 33 in Figs. 1 and 2 and shown in detail in Figs. 3 to 14.

Referring to Fig. 15, shafts 53 and 54 are journaled in any suitable means and supported by frames 55. Endless chains 56 are mounted on sprocket wheels 57 and dogs 58 are mounted on chains 56. One of the shafts 53—54 is connected to a source of power (not shown) to provide travelling movement to the endless chains 56 and the dogs 58 carried thereby. Also the chain take up device 61 is provided for obvious reasons. The cans 39 are fed by gravity from the troughs 51 and through can twisters 52 (Figs. 1 and 2) and enter between two adjacent dogs 58 (Fig. 15). The dogs 58 are of a width less than the length of the cans and engage the center portions of the cans and at the top of the elevator a fixed guide 59 (Fig. 15) is provided which will engage the cans at outer portions of the cans. The chains 56 and the dogs 58 pass through or between the fixed guides 59 but the cans are removed by such fixed guides and enter troughs 60 (Figs. 15, 1, 2 and 3).

The troughs 60 are downwardly inclined and the cans pass by gravity to spacer screw 72, Figs. 3 and 7, and thence to the preheater and cooking retort shown in Figs. 3 to 14 which will now be described.

Referring to Fig. 3, a preheater chamber 70 is disposed above a cooking chamber or cooking retort 71, see also Fig. 2. The cans 39 in the troughs 60 first encounter a driven spacer screw 72, Figs. 3 and 7, so as to provide streams of laterally spaced and timed cans which will be passed through the preheater chamber 70 by means hereinafter described. The preheater chamber 70 is heated by any usual means, as pipes 73 connected to a steam inlet pipe 74. Preferably the preheater chamber 70 is heated by the heat eminating from pipes 73 and such pipes discharge their steam into the bottom of retort 71 (through conduits not shown) to provide the desired temperature and pressure therein. In view of the well known manner in which chambers may be heated by steam pipes, the usual return pipes, traps, safety valves, etc. are not here described or illustrated.

Conveyor mechanism 77, Figs. 3 and 7, is provided within the preheater chamber 70 and in the illustration herein eight conveyors 77, see Fig. 4, are employed for passing eight streams of cans through the preheater. Between the preheater inlet 78, (Figs. 2 and 7) and the spacer screw 72 is a can booster member 76 which is synchronized with the conveyor mechanism 77 as the spacer screw 72 so as to positively urge cans 39 into pocket members 82 shown detached in Fig. 10 and which are described later in connection with the cooking retort.

The preheater chamber 70 is in communication with the atmosphere, as through troughs 60 so that desired temperatures at atmospheric pressure may be obtained in the preheater. Thus, filled, vacuumized and sealed cans of food products may be subjected to the desired temperature for a predetermined period of time as they pass through the preheater chamber 70, causing a portion of the liquid contents of the can to gassify and provide the desired gas pressure within the can. This pressure within the can will permit the can to be subjected to the elevated pressures in the cooking retort 71 without denting or collapsing the cans.

A curved wall 75, Figs. 3 and 7, is provided to facilitate movement of a can 39 by the advancing portion of a pocket means 82 and by the can booster 76. By synchronizing the spacer screw 72, the can booster 76, the conveyor mechanism 77 and pocket members 82 carried thereby, the plurality of streams of cans, eight as here shown, will pass in the direction of the arrows in Fig. 3 along the top lap of the conveyor and be returned at the lower lap of the conveyor. The guides for the ends of the cans, the longitudinal supporting means for the conveyor and cross stays supporting said longitudinal members may be duplicates of those hereinafter illustrated and described in connection with the cooking retort and for such reason are not here described.

At the end of the preheater chamber 70 and shown to the left of Fig. 3 of the drawings are provided chain take up devices 69. These chain take up devices 69 (also shown in detail in Fig. 14) permit expansion and contraction of the length of the conveyor mechanism 77 in the preheater and are similar to the chain take up devices illustrated in Figs. 12 and 13 for use in connection with the cooking retort except that they are not provided with steam tight fittings. In other words, the adjustment for the take up devices 69 is external of the preheater chamber 70 and the chain supporting portions of the chain take up devices 69 are within the preheater chamber, but steam tight packing need not be provided about the opening through which the chain take up devices 69 pass from within the preheater chamber to the outside thereof. Separate chain take up devices 69 are provided for each of the conveyor mechanisms 77, which will require eight in number.

The preheater 70 connects with the cooking retort 71 by way of valve means referred to generally as 80, see Fig. 3 and for a larger fragmentary view see Figs. 7 and 9. The pocket means 82 engage the center portion of the can and a fixed guide 79 engages the cans at their end portions and permits the conveyor 77 and pocket means 82 to pass through the fixed guide means 79 but the said guide means 79 insure that the cans 39 will be diverted and discharged from the preheater chamber 70 and into the inlet valve means 80 of the cooking retort 71 as the pocket members 82 pass this position.

The inlet valve means 80 and the discharge valve means 83 are shown in Figs. 2, 3, 4, 6, 7, 8 and 9 while the cylindrical member within each of said valves is best shown in Figs. 6, 7, 8 and 9. The purpose of the inlet valve 80 and discharge valve 83 is to permit cans to be delivered into and out of a chamber wherein elevated temperatures and pressures are employed with a minimum loss of heat and pressure. The housing members 81 and 84 of the inlet valve means 80 and discharge valve means 83 are similar except for the can inlet and can outlet passageways therethrough. Within said housing members 81 and 84 are rotor members 85, see Figs. 3, 6, 7, 8 and 9.

The valve means designated generally by 80 is in two spaced apart sections, as best shown in Fig. 4, and the valve means designated generally by 83 is also in two spaced apart sections. One of the rotor members 85 is provided in each of these sections. Each rotor member 85 of the valve means 80 is rigidly connected with shaft means 133. Similarly each rotor member 85 of the valve means 81 is rigidly connected with shaft means 132. The two shafts of each valve member are rigidly connected together between the two parts of the valve member by flanged coupling members 87, see Figs. 4 and 8. Bearings 87' are provided for shaft means 133 and 132.

Each rotor member 85 is of generally cylindrical shape and is provided with a plurality of can receiving pockets 88 arranged in circular and longitudinal rows. In the structure shown, each rotor member 85 has four longitudinal and four circular rows of pockets 88. This provides sixteen pockets 88 in each rotor member 85 with four pockets 88 in each longitudinal row and four pockets 88 in each circular row.

The housings 81 and 84 are internally ground finished and the periphery of each rotor 85 is similarly ground finished to provide a sliding seating fit and a minimum of steam loss past the inlet and discharge valve members 80 and 83. The cans are urged into the inlet valve member 80 by the forward portion of a pocket member 82 trailing a can 39. The cans are discharged from the valve members 80 and 83 by can ejectors 89. Can ejectors 89 are mounted on shafts 90, of which there are four in number in each valve housing. Shafts 90 carry arms 91 each provided with a roller 92 operating in a cam groove 93. Cam groove 93 is carried by a fixed portion 93' of the machine so that as rotor 85 rotates and roller 92 follows cam groove 93, (Figs. 6, 8 and 9) the can ejectors 89 will, in proper timed relation, eject the cans from the discharge valve 83 into the can discharge chute 94 (Figs. 3 and 6) or from the inlet valve means 80 out the valve outlet 95 (Figs. 3 and 7) and into the cooking retort 71.

Referring again to Fig. 3 and the enlarged portion of the inlet valve shown in Fig. 7, cans 39 will be discharged from the conveyor mechanism 77 of the preheater 70 into a pocket 88 of the inlet valve mechanism 80. Through the gearing mechanism hereinafter described, the rotor 85 of the inlet valve 80 is synchronized with both the conveyors 77 of the preheater 70 and the plurality of superposed conveyors 96 of the cooking retort 71. Cans 39 discharged from the preheater 70 and into a pocket 88 of the inlet valve 80 will be carried by the said pockets 88 for substantially two-thirds of a revolution. Upon operation of a can ejector 89, when a can reaches the outlet 95 (see Fig. 9) the can will be positively urged into a pocket member 82 of the conveyors 96 in the cooking retort 71 and at a time when the pocket members 82 on said conveyors 96 are passing around a curve and are open or spread apart to receive a can. After ejecting a can and before the then empty pocket means 88 of the inlet valve 85 reach the inlet opening 97 in the housing 81 of said inlet valve 80, the can ejector 89 will be moved back to a position so that the pocket 88 may receive a can. It will be noted in connection with Fig. 9 that the shape of the cam groove 93 is such that the can ejectors 89 are in a retracted position except during the ejecting operation.

The shape of the pocket means 82, employed both in the preheater chamber 70 and cooking retort 71, is preferably of a form shown in Fig. 10. These pocket means 82 comprise a base portion 100 (shown partly broken away in Fig. 10 so portions 100' may be seen) and which base portion 100 preferably has integral therewith portions 100' forming links of the conveyor chain. Spacer links 101 (Figs. 6 and 7) are provided between the link portions 100' on the base portions 100. The pocket 82 is provided with a portion 102 which extends substantially at right angles to the base 100 and to the conveyor chain and will project upward on one lap of the conveyor chain and downward on the other lap. A curved portion 103 extends between the right angle portion 102 and a portion 104 which extends substantially parallel to the base 100 and in the same direction as the base 100 and in a direction counter to the direction of travel of the conveyor. With such form of pocket member 82 the cans are supported by the base 100 during one direction of travel and held in a pocket member formed by the portions 102, 103 and 104 and the portion 102 of the next succeeding pocket member 82 in the line of travel of the conveyor. On the other direction of travel the cans are supported by the portions 104 and held in place by the right angle portion 102 of the next succeeding pocket member 82. The curved portion 103 also functions to help eject cans upon their discharge from a conveyor mechanism.

Cans 39 passing through outlet 95 (Figs. 3 and 7) of the inlet valve 80 will be urged between two pocket means 82 at the time the right angle portion 102 of one pocket means is passing around a gearwheel 128 and is substantially horizontal, while the right angle portion 102 of the next pocket means in advance thereof is in substantially a vertical position, as shown in Figs. 3 and 7. As the pocket member 82, which has received the can while its right angle portion 102 was substantially horizontal, advances it will move closer to the upright member 102 that precedes it and the can 39 will be trapped and held between the two pocket members and will be carried on the upper flight of the top conveyor 96 in the cooking retort 71 in a direction to the left, as shown in Figs. 3 and 7 of the drawings. End supports 105 are provided for the upper lap of each conveyor. Other end supports 105' are provided for the lower lap of each conveyor. There are eight conveyors laterally of the machine and there will be sixteen of each of the end supports 105 and 105'. An upper support 106 is provided to support the upper lap of each conveyor 96 and a lower support 107 is provided to support the lower lap of each conveyor 96. As shown, each end support 105 is the upright flange of an angle bar and each upper support 106 is the horizontal flange of an angle bar. A plurality of transverse cross stays 108 help to support the supports 105, 106, 105' and 107 at spaced locations, (see Figs. 4, 6, 12, and 14) and the supports 105, 106 and 105' and 107 are also supported from the ends of the retort housing as shown in Figs. 3, 6, 12 and 14. Lateral movement of the cans on each conveyor is prevented by the end supports 105 and 105' and the conveyor chains 96 are prevented from sagging by supports 106 and 107. Preferably channel shaped brackets 107' are used to tie the supports 105' and 107 together, as shown in Figs. 3, 4, 6, and 12.

After the cans on the upper lap of top conveyor 96 have travelled from the right hand end of the machine to the complete left hand end thereof, they are guided by plate 109 (Figs. 3, 12 and 13) about an arc of 180°. The cans will by reason of gravity tend to follow the pocket members 82. However, in the event that they do not completely follow a pocket member, the right angle portion 102 of the next succeeding pocket member will urge the cans properly in position after they have travelled about an arc of 180°. The take-up devices 110 (Figs. 3, 12 and 13) for keeping the conveyors 96 in position will be hereinafter described and serve to eliminate slack in the conveyors 96. In the particular illustration shown in Fig. 3, there will be one take-up device 110 for each conveyor and as six superposed conveyors are shown and eight rows thereof, there will be forty-eight take-up devices 110. A number of these take-up devices are shown in end elevation in Fig. 5.

The cans travelling on the lower lap of the top conveyor will move from the left as respects the showing in Fig. 3 to the right thereof until they encounter a fixed guide 111. The pocket members 82 are of a width less than the length of the cans 39 and said pocket members 82 engage the center portion of the cans 39 (see Fig. 11). The can guides 111, two in number for each conveyor (see Fig. 11 and also Figs. 3 and 6), engage a can at the end portions thereof, leaving a space between the can guides 111 and the pocket members 82. Rotating boosters 112 (see also Figs. 3, 6 and 11) are in timed relation with the conveyors 96 so that the cans engaging the fixed guides 111 are positively moved from the lower lap of the top conveyor 96 to the next conveyor 96 therebelow, and are urged between two pocket members 82 and again travel on the top lap of the second conveyor to the left of the device as shown in Fig. 3 and then return on the lower lap to the right hand side of said machine. This continues in a similar manner for the various superposed conveyors and of course for the number of conveyors and for the number of superposed conveyors laterally considered, which are eight in number in the particular illustration.

When the cans 39 are travelling to the right on the lowermost lap of a conveyor they will encounter fixed guides 113 (Figs. 3 and 6). The conveyor mechanism will pass through or between the fixed guides but the cans will be deflected by the fixed guides 113 and will be urged by the conveyor mechanism into a pocket 88 of the discharge valve 83. After the rotor 85 of the discharge valve 83 moves substantially 180°, the cans will be ejected by the ejectors 89 into the can discharge chute 94.

I have thus provided a series of conveyor chains in superposed relation which will serve to carry filled, vacuumized and sealed cans in one direction on the top lap of the conveyor and return the said cans on the bottom lap of the conveyor to the same end at which they were delivered to the conveyor. Then the said cans are positively discharged to the top lap of the conveyor mechanism therebelow and similarly moved in one direction and then returned. The conveyors and cans thereon are supported throughout their travel so that a minimum of agitation occurs and the cans are not turned except at the time of change of their direction of travel. It will be observed that in this particular device illustrated the cans will be rotated only eleven times in their travel through the cooking retort 71 and will be supported against agitation at all times in their travel, thus providing for increased cooking speed and enhancing the quality of the cooked product.

A housing member 114 (Fig. 3) is provided at the intake and discharge end portion of the preheater and cooker so that any heat which may escape from either the discharge valve 83 or the intake valve 80 will be conserved and pass into the preheater 77.

Referring to Figs. 12 and 13 and also to Fig. 3, take-up device 110 for the cooking retort is shown. In view of the temperatures encountered in the preheater chamber 70 and cooking retort 71, it is necessary to allow for expansion and contraction in the length of the chains used in the conveyor mechanisms. In said Figs. 12 and 13 a fragment of the end wall 115 of the cooking retort 71 is shown. A frame 116 is secured to said end wall 115 by any suitable means. A shaft 117 is slidably supported by said frame 116 and said end wall 115. An adjustable packing device 118 of usual construction surrounds the shaft 117 to provide for a steam tight sliding connection between the packing device 118 and the shaft 117. The shaft 117 extends into the cooking retort 71 and supports a yoke frame 119, which yoke frame 119 in turn supports horizontal shaft 120 on which is mounted a sprocket 121 and thereon the conveyor 96. The yoke frame 119 is provided with slots 122, which interfit with the transverse cross stays 122' to support the yoke frame 119 against rotary movement and maintain proper alignment of a shaft 120 with its conveyor mechanism 96. A compression spring 123 is provided and nut means 124 permits desired adjustment of the spring tension of spring 123 to maintain a conveyor 96 taut. If desired, the nut means 124 may be adjusted during operation as it is externally positioned. Each conveyor in the cooking retort, which as here shown are forty-eight in number, will have its own separate take-up means shown in Figs. 12 and 13.

The take-up means 69 for the conveyors in the preheater chamber 70, which are shown in Fig. 14, are similar in construction to the take-up device shown in Figs. 12 and 13, except that the stuffing box or packing device 118 has been eliminated, as it is not necessary. In this connection it will be remembered that atmospheric pressures obtain in the preheater chamber 70. In the interests of brevity similar numbers are placed on similar parts of the take-up device shown in Fig. 14 to the take-up device shown in Figs. 12 and 13, and no further description is given.

The conveyor mechanism 77 in the preheater chamber 70, the inlet valve means 80 to the cooking retort 71, the conveyor means 96 in the cooking retort 71, the outlet valve means 83 of said cooking retort, and the rotating boosters 112 in the cooking retort 71 are driven in synchronous timed relation. As illustration thereof I have provided (see Fig. 4), a driven shaft 125 which serves as a source of power. This shaft 125 is connected to a vertical shaft 126 by any suitable means as a worm drive. The shafts 127 support the sprockets 128 on which are mounted the conveyors 96. Spur gears 129 connect the shafts 127 with the shaft 126. Discharge valve 83 is geared with the shaft 126 by providing gears 130 and 131. In other words, the lowermost shaft 127, as shown in Fig. 4, has one end portion connected by gears 129 with the shaft 126. The other or left hand end of said shaft 127 in Fig. 4 connects by gears 130 and 131 with the two part shaft 132 supporting two part rotor 85 of the discharge valve 83. The two part shaft 133 supporting the rotor of the two part intake valve 80 is connected by gears 134 and 135 with the uppermost shaft 127 in the cooking retort 71. The shaft 133 is also connected by gears 136 and 137 with the shaft 138. On the shaft 138 are mounted the conveyor mechanisms 77 in the preheater chamber 70. The shaft 141 on which the can boosters 76 are mounted is connected by gears 142 and 143 with the shaft 138 on which the preheater conveyors 77 are mounted. The driving means for the shafts 112' of can boosters 112 may consist of link belt means 144 positioned within the cooking retort, as shown in Fig. 6, or these shafts 112' may be extended to the exterior of the retort and suitably geared to the shaft 126 or other driven shafts. The driving connections just described serve to time the movement of the conveyors 77 in the preheater chamber 70, the intake valve means 80, the conveyors 96 in the cooking retort 71, the can boosters 76 and 112, and the outlet valve means 83. The spacer screws 72 are preferably driven by worm drive means 139, see Fig. 7, from a shaft 165. The shaft 165 is connected by link belt means 166 with the shaft 138 which is driven from shaft 126. This synchronizes the spacer screws 127 with the other driven parts of the preheater and retort which are connected directly or indirectly with the shaft 126.

The elevator 32 as shown in Figs. 1 and 2 and shown more in detail in Fig. 15, has one of its driving shafts 53 or 54 connected by suitable driving means (not shown) with the shaft 125 or one of the shafts driven thereby, so as to time the operation of the elevator means 32 with the various moving parts in the preheater chamber 70 and cooking retort 71. The cans in the divider 31 (see Figs. 1 and 2) will be fed at such rate so that a supply of cans will always be available at the intake of the elevator 32. The cans will then be in timed relation through the elevator 32 and the preheater chamber 70 and cooking retort 71. Cans leaving the cooking retort 71 will be delivered to the conveyor 34 generally shown in Fig. 2.

The various shafts 127, Figs. 3 and 4, supporting the conveyor mechanisms in the cooking retort 71 are provided with stuffing boxes 140 of usual construction to permit said shafts 127 to rotate, be driven by external gears, and yet provide a steamtight connection.

The conveyor mechanism 34 of Fig. 2 is driven at a somewhat accelerated rate, so as to keep a constant supply of cans available for the elevator 35, Figs. 1 and 2, which is identical in function with the elevator 32 except for length and angular direction and for such reason is only shown diagrammatically in Figs. 1 and 2. The details of elevator 35 will be identical in function with the details of the elevator shown in Fig. 15. Cans delivered from the elevator 35 will be delivered to the conveyor 37 shown somewhat schematically in Figs. 1 and 2. This conveyor 37 may be identical in function with the conveyor 34 and again the conveyor 37 runs at an accelerated speed to insure a constant supply of cans to the cooler 36 shown somewhat schematically in Figs. 1 and 2. Conveyor mechanisms are provided in the cooler device and such mechanisms may be similar to the conveyor mechanisms employed in the preheater 70 and the cooker 71. Such conveyor mechanisms, the elevator 35, elevator 32 are in timed relation and driven from a common source as the shaft 125 Fig. 4 to provide timed relation between the cooler 36 and the combination preheater chamber and cooking retort 33 in Fig. 1. Obviously the cooler 36 must be operated at a speed fast enough so that it will accommodate the output from the combination preheater and cooker 33. One way of accomplishing such purpose is to provide the same speed for both as above indicated, where they are driven by a common source as 125.

The purpose of the cooler device 36 shown in Figs. 1 and 2 is to pass the cans through a cooling medium for a predetermined time period so that the cans will be uniformly cooled and in timed relation to the cooking, so that the cooking will be arrested and uniform cooking of the contents of the cans will obtain. The cooler mechanism 36 may be in all respects identical with the cooking retort 71, except that the cooler 36 is in communication with the atmosphere and is communicatively connected at any suitable location (not shown) with a source of fluid of desired temperature. The direction of feed to the cooler 36 may be modified so that it may be used alone or in combination with other devices. The cooler 36 provides for heat exchange between fluid and the cans filled with food products. Thus obviously it may be used either as a cooler or as a low pressure cooker—a low pressure cooker being one where elevated pressures are not employed.

In order to eliminate loss of fluid as water in the cooler 36, the cans enter and are discharged from an upper portion thereof.

Referring to Fig. 1, which is a plan view, the converger 38 has eight chutes 162. The purpose of the converger is to converge the eight streams of cans to a single stream, as the capacity of the casing machines is such that it is necessary to feed all eight streams into one to coordinate with the capacity of the casing machine. The cans roll by gravity down the chutes 162 and four streams enter each chute 163. Then the two chutes 163 deliver into a common chute 164. Thereafter the cans pass either directly to the casing machines or first pass through a can twister, as 52 of Figs. 1 and 2, to turn the cans on end, depending upon the particular construction of the casing machine used, which is not here shown as the same forms no part of this invention.

Referring again to Figs. 1 and 2, a continuous stream of filled, vacuumized and sealed cans is delivered to the inlet 30 from the usual seamer devices. These cans pass through the divider 31 so that the one stream of cans provided by the seamer device is divided up so that eight streams are provided. Each of these eight streams of cans is provided with its respective elevator 32, so that eight streams of cans will be delivered to the combination preheater and cooking retort 33. After the cans have been first preheated in the preheater chamber 70 at atmospheric temperature, they are deliverd in a continuous stream to the cooking retort 71 where they are cooked at the desired temperature and pressure for the desired period of time. All cans are given the identical preheating and cooking treatment as they are delivered through the cooking mechanisms by timed conveyor mechanisms. Also the cans are moved through the cooking retort with a minimum of agitation and are periodically turned to provide for utmost rapidity of cooking, uniformity of cooking, and conditions which do not in any wise adversely affect the texture of the canned product. Thereafter eight streams of cooked filled cans are delivered by eight conveyors 34 to eight elevators 35. The eight streams of cans from the elevators 35 are delivered via eight conveyors 37 to the cooler 36. The eight streams of cans take a circuitous route through the cooler 36 and are subjected to a fluid of desired temperature to cool the cans. Again, each can is given a uniform cooling treatment and in timed relation to the cooking retort 33, so that the cooking of the product within the cans will be uniformly arrested to provide for uniform cooking. In most instances it will not be necessary to provide artificial cooling of the fluid within the cooler 36 if sufficient supply of running water or relatively cool water is available. The eight streams of cans leaving the cooler 36 pass through the converger 38 and are there formed into one stream so that the one stream of cans may be delivered to the usual casing devices.

Obviously, changes may be made in the forms, dimensions and arrangement of the parts of the invention, without departing from the principle thereof, the above setting forth only preferred forms of embodiment.

We claim:

In a device for processing canned foods, a housing member; a preheating chamber in communication with the atmosphere and positioned in the upper portion of said housing member; means providing heated fluid under atmospheric pressure in said preheating chamber; a cooking chamber in said housing member, sealed from the atmosphere and positioned below said preheating chamber; means providing heated fluid under pressure above atmospheric pressure in said cooking chamber; can travel providing means in each of said chambers; can feeding means connected with said preheating chamber; and a rotatively movable fluid seal can transfer valve means interposed between said two chambers operative to transfer cans from said preheating chamber to said cooking chamber and to substantially prevent transfer of heated fluid under pressure between said two chambers, whereby any inadvertent leak in said valve means will permit use of escaping heated fluid in said preheating chamber.

EMILE O. MEHLINE.
WILLIAM CALVERT.